H. L. BOYER.
METHOD OF MAKING RUBBER STORAGE BATTERY JARS.
APPLICATION FILED FEB. 23, 1917.
1,352,170.
Patented Sept. 7, 1920.
2 SHEETS—SHEET 1.
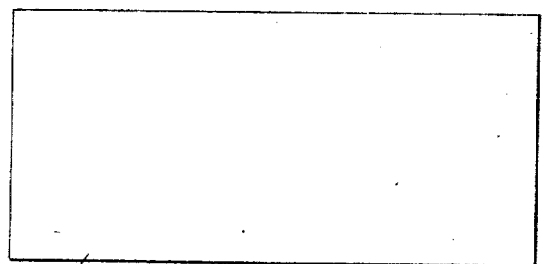
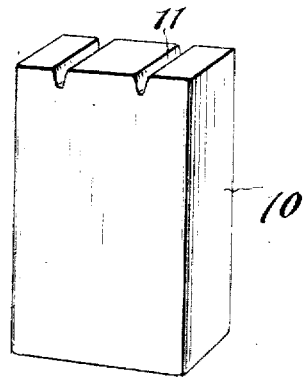
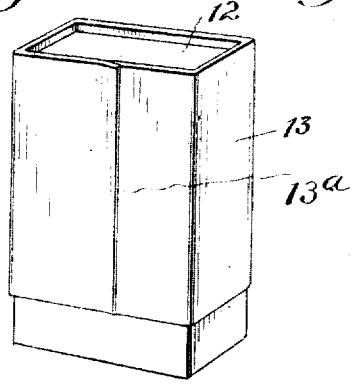
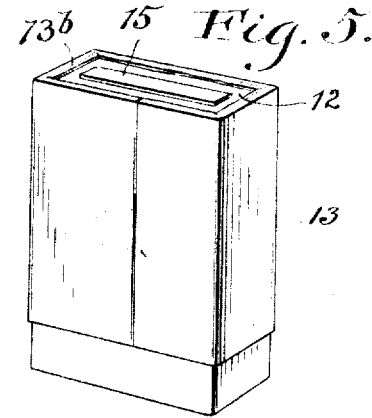
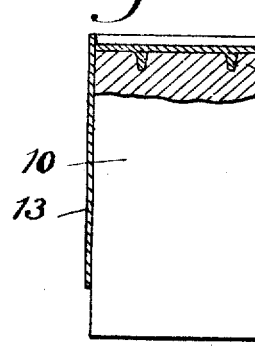
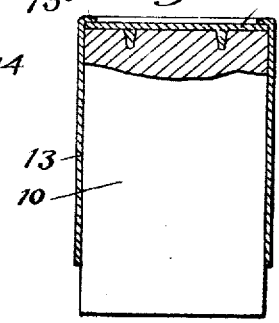
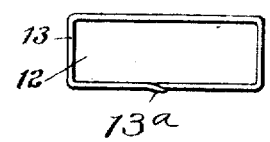
Inventor:
Harry L. Boyer
by Thurston & Kwis
Attys.

UNITED STATES PATENT OFFICE.

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

METHOD OF MAKING RUBBER STORAGE-BATTERY JARS.

1,352,170.  Specification of Letters Patent.  Patented Sept. 7, 1920.

Application filed February 23, 1917. Serial No. 150,346.

*To all whom it may concern:*

Be it known that I, HARRY L. BOYER, a citizen of the United States, residing at Trenton, in the county of Mercer and State of New Jersey, have invented a certain new and useful Improvement in Methods of Making Rubber Storage-Battery Jars, of which the following is a full, clear, and exact description.

This invention relates to a process of making storage battery jars from sheets of soft, uncured rubber, and has for its chief object to provide a method such that jars can be formed more rapidly and more uniformly as to shape and dimensions, and better, that is, with a less percentage of imperfect jars or "leakers" than with the methods used heretofore.

In carrying out my invention, I place sheets of uncured rubber, previously rolled and cut to the proper size, about the sides and end of a core, and lap the edges of the sheets, using preferably two sheets, one of which is placed over the end of the core and the other of which is wrapped around the sides of the core, and then heavy pressure is applied simultaneously to the four sides and end of the core and jar being formed and thereon, pressing the sheets uniformly and at substantially all points against the faces of the core and effectively closing all joints or seams by simultaneously pressing together at all points all overlapping portions. In other words, the jar is first formed on the core somewhat roughly, it being immaterial at this stage wherether the rubber adheres closely to the core and whether the points are securely cemented together, and then by the simultaneous application of pressure to the four sides and end of the jar being formed, the pressure being uniformly applied coextensively with the sides and end, the completion prior to and aside from vulcanization of a substantially perfect jar is quickly accomplished.

The invention may be further briefly summarized as consisting in certain novel steps of the method as will be more fully hereinafter described and set forth in the appended claims.

Figure 9:
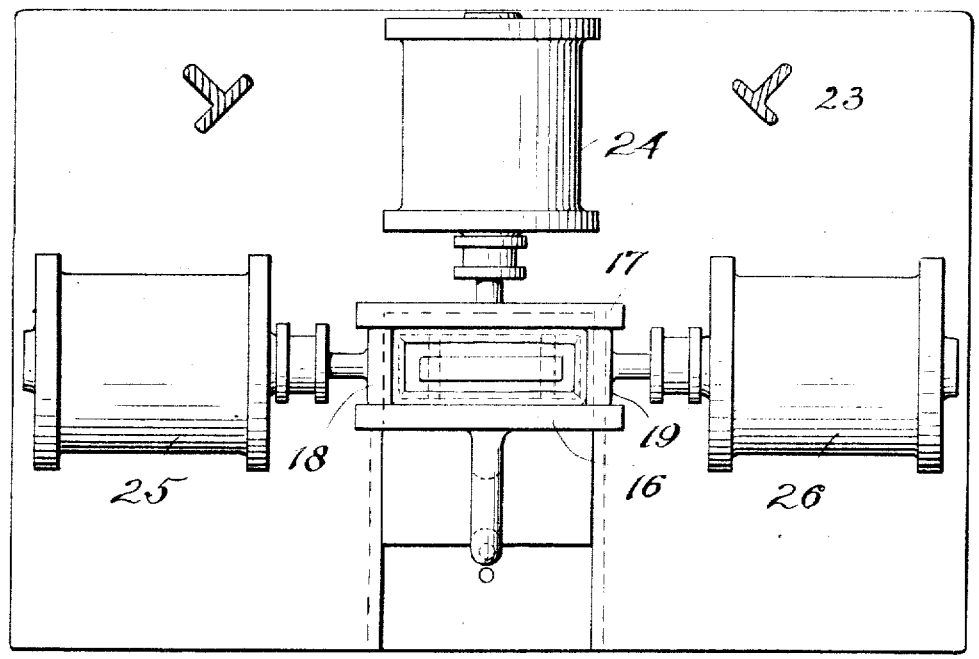
Figure 10:
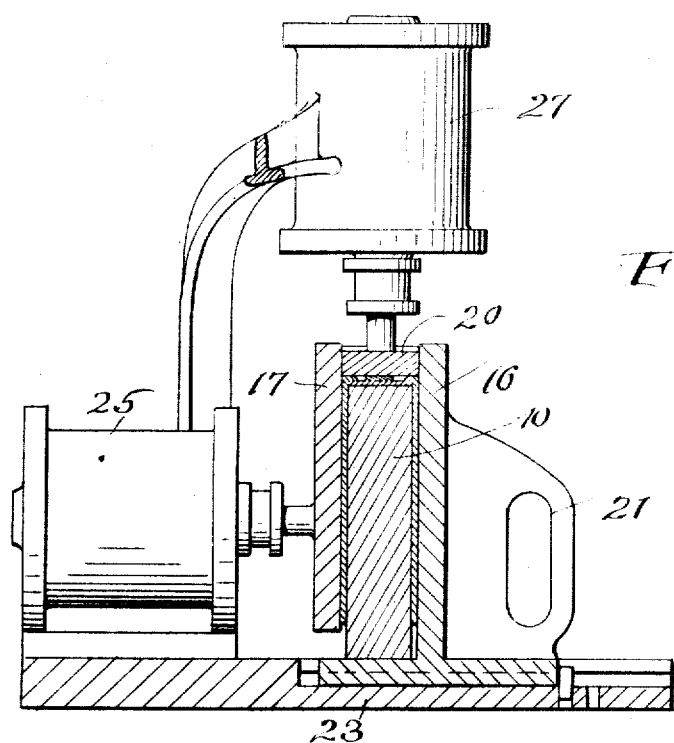

In the accompanying sheets of drawings wherein I have illustrated the jar in the various stages of manufacture, and apparatus and materials utilized in carrying out the method, Figure 1 is a face view of the previously prepared rolled and cut sheet of rubber which is wrapped or folded around the core to form the four upright sides of the jar; Fig. 2 is a similar view of a relatively small piece or sheet which is used in forming the end of the jar; Fig. 3 is a perspective view of the core which is utilized; Fig. 4 is a perspective view of the core after the two sheets have been applied thereto; Fig. 5 is a similar view after the top edge of the sheet wrapped around the core has been folded down over the sheet or piece which forms the end of the jar; Fig. 6 is a vertical section through the core and sheets in the form shown in Fig. 4; Fig. 7 is a similar view of the core and jar in the stage or condition shown in Fig. 5; Fig. 8 is a view looking onto the top of Fig. 4; Fig. 9 is a plan view with the top portion removed, showing the pressing machine, this view illustrating the manner in which the four upright sides of the jar are compressed against the corresponding sides of the core; and Fig. 10 is a vertical sectional view of the same illustrating the upper plunger by which the bottom of the jar is compressed onto the end of the core at the same time that the sides are compressed, these two figures showing the last step of the process prior to vulcanization.

To form the jar by my method, I utilize a core 10, the shape of which corresponds to the inside dimensions of the jar to be formed, except the length of the core is somewhat longer than the height of the jar to be formed. This core is a rectangular body of metal, provided at the upper end with transverse V-shaped slots 11 in which pieces of rubber are placed to form the bridges or rests with which the bottom of the jar is provided, and which are designed to support the battery plates and separators to be placed in the jar. The faces of the core are, of course, smooth, and opposite sides are parallel. In forming the jar I employ two sheets 12 and 13 of plastic uncured rubber which are previously rolled to the proper thickness and cut to the proper size. The sheet 12 forms the end of the jar, and the sheet 13 is designed to be wrapped around the core to form the four upright sides of the jar. Prior to applying these sheets to the core, they are covered or coated with rubber cement, and the core is likewise covered with the cement so that when the soft rubber is applied thereto, and especially when subjected to pressure at all points as hereinafter described, it will adhere to the core at every point.

Before the piece 12 is laid onto the end of the core, pieces of previously formed hard rubber of the proper length are laid into the slots 11, these pieces being illustrated at 14 in Figs. 6 and 7, and after being placed in the slots they are driven in, and the tops or upper portions are cut flush with the end face of the core. Then the sheet 12 is placed on the end of the core, after which the sheet 13 is wrapped around the core with the edge portion projecting up beyond the end sheet 12 in the manner illustrated in Figs. 4 and 6. The sheet 13 is of sufficient length that the ends lap somewhat in the manner illustrated at 13ᵃ in Figs. 4 and 8, but the seam or joint 13ᵃ is preferably pressed down by means of a roller so that the overlapping portions will not project outwardly beyond the face of the sheet to a very great extent.

Next, the operator with his fingers folds down the upstanding edge of the sheet 13 in the manner shown at 13ᵇ in Fig. 5, so that a portion of the sheet 13 is lapped over the end piece or sheet 12, around the entire edge of the latter. I prefer to place a strip 15 of the uncured rubber across the end sheet 12 within the down folded portion 13ᵇ of sheet 13, as shown in Fig. 5, so that after the jar is formed or completed, it will have a firm base of ample area. All these steps of the process are performed rapidly, it being unnecessary that the seams be carefully and securely closed at all points in view of the fact that the jar is subjected to great pressure in the next step of the process. Nevertheless, up to this stage of the process there has been formed, more or less roughly, a jar in substantially the form that it possesses after the last step of the process. In other words, the jar has been formed by hand in substantially its final form or shape.

Next the core with the partially completed jar formed on it in the manner described, is placed in a pressing machine, and heavy pressure is simultaneously applied on all four sides and the end over the entire surfaces of the latter. Preferably this machine includes two plungers 16 and 17 which engage two opposite sides of the jar, two plungers 18 and 19 which engage two other opposite sides, these four plungers having vertical pressing faces, and a fifth plunger 20 which moves vertically, and which engages the end of the jar. I have not here shown all the details of this machine, but preferably the plunger 16 is movable inward and outward by hand, and when moved inwardly to operative or compression position, is locked by any suitable locking device, while the other plungers are all actuated by air or other fluid pressure motors, preferably of the reciprocating type. Therefore, the plunger 16 is provided with a handle 21 by which it may be moved back and forth, and it is provided also with an extension 23 on which the core with the partially completed jar is supported. Plungers 17, 18 and 19 are connected to pistons, not shown, which are adapted to move back and forth in horizontally disposed air or other fluid pressure cylinders 24, 25 and 26, while the upper plunger 20 is connected to a piston which operates in a similar vertically disposed cylinder 27. By means of a suitable valve and piping not here shown, the plungers are controlled. Therefore to complete the final step of the process prior to vulcanization, the core with the jar formed on it is placed on the extension 23 of plunger 16, and when the latter has been moved inwardly and locked, the inward movement carrying inward to compressing position the core and jar, air is admitted to the outer ends of the four cylinders, causing all the plungers to be actuated or moved inwardly onto the jar either successively or simultaneously with the result that pressure is applied simultaneously on the four upright sides and the end of the jar. I prefer to employ an air pressure of at least one hundred pounds to the square inch so that the jar is thus subjected to very excessive pressure which flattens almost perfectly the sides and end of the jar and causes the latter to stick very firmly at all points to the core, and what is more important, the pressure is applied to the joints or seams, at every point thereof at the same time, causing the closure of the seams at all points. This is one of the most important features of the process for it is exceedingly more effective than any process wherein pressure is applied first at one point of a seam and then at another, because if pressure is applied at one point and then relieved at that point and applied at another point there is a possibility that the seam will open after the pressure is removed and while pressure is being applied at another point. With this method, however, by simultaneously applying pressure to all points of each seam, and in fact, to the entire surface of the jar at one time, every point of all the joints or seams are closed, and they do not open at any point when the pressure is removed. The pressure is allowed to remain on the jar for a brief interval after the plungers are all actuated inwardly, and then by the actuation of the valve the plungers are retracted and the jar thus compressed on the core is removed from the machine.

To complete the jar, the jar and core are placed in a vulcanizer and remain in the vulcanizer for several hours, or for a sufficient length of time to permit the rubber to become hardened and the joints knitted or vulcanized together. After removal from the vulcanizer the jar is stripped from the core and is ready for use, except it is sometimes ground slightly on the bottom surface and at its top or open edge so that it will stand squarely in the battery box and will have an even smooth top edge.

With jars made by this process, not only are they neatly and uniformly formed, and with a practically negligible percentage of so-called leakers or defective jars, but the vertical seam where the ends of the sheet 13 are lapped along one side of the jar, is practically eliminated, there being scarcely any evidence of the seam or joint. Additionally the jar is given a very smooth polished surface on its outer sides, this being preferably accomplished by surfacing the sheet 13 on its outer side with thin tin in sheet form, which is removed from the jar after vulcanization.

Having thus described my invention, what I claim is:

1. The method of making storage battery jars which comprises placing sheets of uncured rubber over the end and around the sides of a rectangular core with the edges of the sheets overlapped, applying pressure by flat pressure applying devices simultaneously to the sides and end of the jar thus formed on the core, removing the pressure and vulcanizing the jar on the core.

2. The method of making storage battery jars from sheets of uncured rubber which comprises forming the jar on a rectangular core by placing a sheet of rubber on the end of the core wrapping a sheet of rubber around the sides thereof, and lapping the sheets, pressing flat surfaces under pressure against the four sides and the end of the jar so that pressure will be applied to substantially all points of the jar simultaneously, removing the pressure and vulcanizing the jar on the core.

3. The method of making storage battery jars from uncured rubber in sheet form which comprises placing a sheet of rubber over the end of a rectangular core, wrapping a sheet of rubber around the sides of the core and lapping the edge of the last named sheet over the sheet which is placed on the end of the core, subjecting the jar and core to pressure applied to the four sides and end by the inward movement of flat pressure applying devices so that the pressure is applied to substantially all points of the jar at the same time, removing the pressure and vulcanizing the jar on the core.

4. The method of making storage battery jars from sheets of uncured rubber which comprises placing a sheet or piece of uncured rubber over the end of a rectangular core, wrapping a sheet of the same material around the sides of the core, lapping the ends of this sheet and lapping the edge portion of this sheet over the first named sheet placed on the end of the core, compressing the jar thus formed on the core simultaneously at substantially all points thereof by applying pressure through the medium of flat pressure applying devices to the four sides and end of the core, removing the pressure and vulcanizing the jar on the core.

5. The method of making storage battery jars from sheets of uncured rubber which comprises applying rubber cement to sheets of rubber and to a rectangular core, placing the cemented side of one sheet over the end of the core, wrapping a second sheet around the sides of the core with the cemented side next to the core, and lapping the upper edge of the sheet over the sheet placed on the end of the core, and subsequently applying pressure simultaneously onto the four sides and end of the jar thus formed on the core by the inward movement of flat pressure applying devices to cause the rubber to adhere closely to the jar and to close the seams or joints at all points, relieving the pressure and subsequently vulcanizing the jar on the core.

In testimony whereof, I hereunto affix my signature.

HARRY L. BOYER.